J. B. DRUM AND F. J. EVERETT.
BICYCLE.
APPLICATION FILED JUNE 8, 1921.
1,405,982.
Patented Feb. 7, 1922.
2 SHEETS—SHEET 1.
FIG_1_
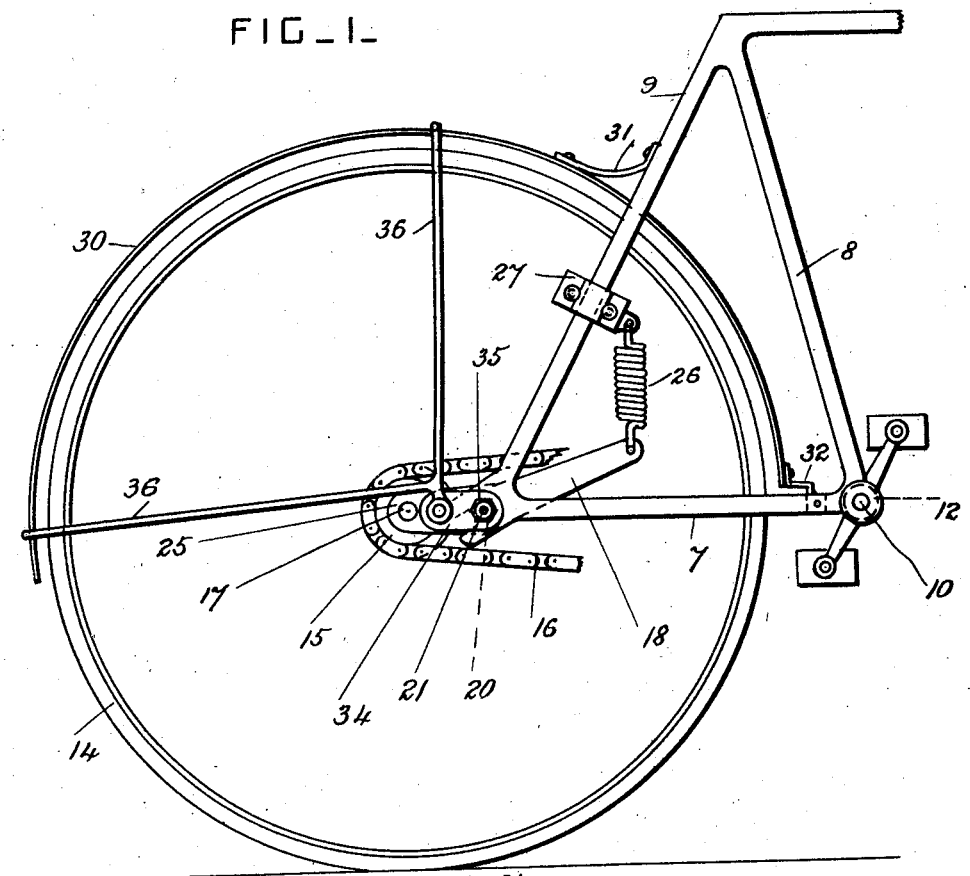
FIG_2_
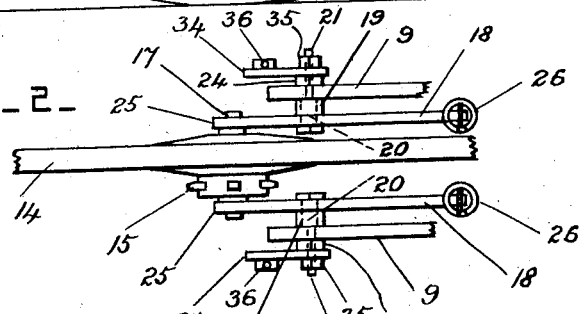
FIG_3_
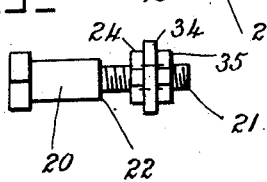
Inventors:
James B. Drum, and
Frederick J. Everett
by Herbert W. Jenner
Attorney.

J. B. DRUM AND F. J. EVERETT.
BICYCLE.
APPLICATION FILED JUNE 8, 1921.
1,405,982.
Patented Feb. 7, 1922.
2 SHEETS—SHEET 2.
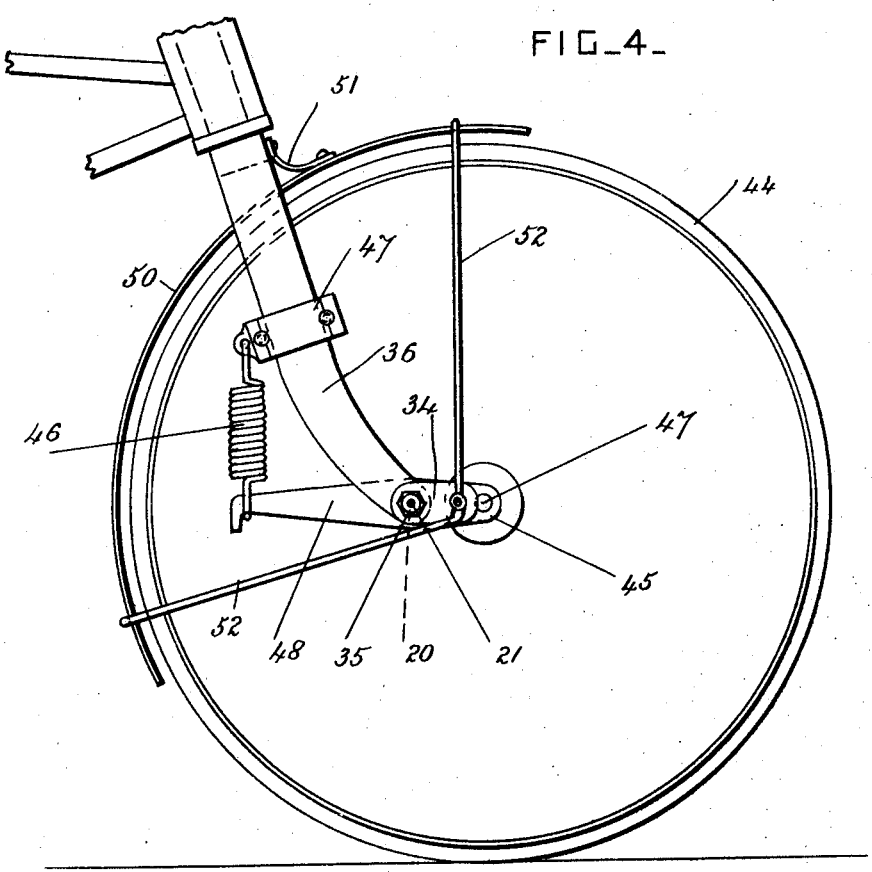
FIG_4_
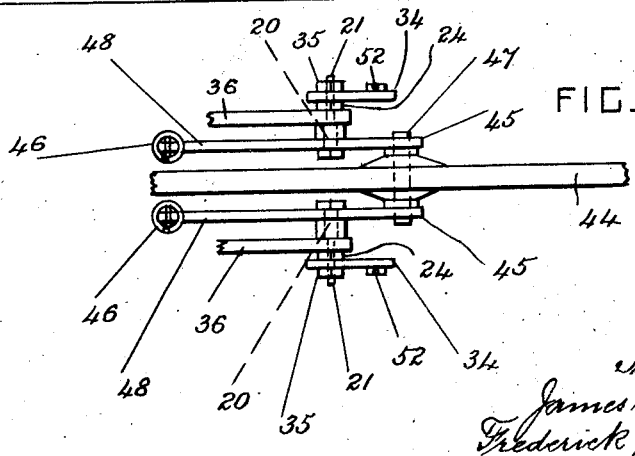
FIG_5
Inventors:
James B. Drum, and
Frederick J. Everett
by Herbert W. Jenner.
Attorney.

UNITED STATES PATENT OFFICE.

JAMES B. DRUM AND FREDERICK J. EVERETT, OF WILKES-BARRE, PENNSYLVANIA.

BICYCLE.

1,405,982.  Specification of Letters Patent.  Patented Feb. 7, 1922.

Application filed June 8, 1921. Serial No. 475,938.

*To all whom it may concern:*

Be it known that we, JAMES B. DRUM and FREDERICK J. EVERETT, citizens of the United States, residing at Wilkes-Barre, in the county of Luzerne and State of Pennsylvania, have invented certain new and useful Improvements in Bicycles, of which the following is a specification.

This invention relates to bicycles which are operated by foot or by motor; and it consists in the novel construction and combination of the parts hereinafter fully described and claimed whereby the frame is supported by springs adapted to absorb the shocks of riding over rough roads, and whereby the positions of the mud guards are regulated.

In the drawings, Figure 1 is a side view of the rear portion of a bicycle provided with shock absorbing springs and adjustable mud guards according to this invention. Fig. 2 is a plan view of portions of the same, showing the spring controlled levers. Fig. 3 is a detail view of one of the lever fulcrum pins or pivots drawn to a larger scale. Fig. 4 is a side view similar to Fig. 1, and shows the front end portion of the bicycle. Fig. 5 is a plan view of portions of the devices shown in Fig. 4

The frame of the bicycle is similar to that of a safety bicycle of approved construction, and its rear part has frame bars 7, 8 and 9 arranged in triangular form. The crank or driving axle 10 is journaled in bearings 12 at the junction of the lower and front ends of the bars 7 and 8, and the bars 9 extend upwardly and forwardly between the outer ends of the bars 7 and 8. The rear or driving wheel 14 is provided with the usual sprocket wheel 15 for the drive chain 16, and it is mounted to revolve on a pin 17. The levers 18 are provided, and have hubs 19 which are arranged right and left. Each of these hubs is mounted to oscillate on a fulcrum pin 20. Each pin 20 has a screwthreaded end portion 21 of smaller diameter than its main portion, and which forms a shoulder 22 with its main portion.

The end portion 21 is secured in a hole in the frame 9 by means of a nut 24, the frame being clamped tightly between the shoulder 22 and the nut 24. The end portions of the levers are of unequal length, and the pin 17 on which the hub of the wheel 14 revolves is secured in holes in the rear and shorter end portions 25 of the levers 18, which are arranged one on each side of the wheel.

The longer end portions of the levers 18 engage with the lower end portions of helical springs 26, and the upper end portions of these springs are connected to the inclined rear members 9 of the frame by clamps 27. The clamps 27 may be secured to the frame bars 9 at various distances above the axis of the road wheel, so as to adjust the strength of the helical springs, and the said springs are arranged substantially vertical.

The rear wheel 14 is provided with an adjustable mud guard 30 of any approved cross-section. The front portion of the mud guard is connected to the frame by any suitable hinged, flexibe or resilient brackets 31 and 32. The bracket 31 is secured to the inclined bars 9 of the frame, and the bracket 32 is secured to the horizontal frame bars near the driving axle.

Plates 34 are clamped on the screw threaded end portions 21 of the pins 20, by means of nuts 35, the plates being clamped between the nuts 24 and 35. The plates 34 project radially and rearwardly of the pins 20, and 36 are rods secured to the free rear end portions of the plates 34 and to the upper and rear parts of the mud guard. The position of the mud guard is adjusted, so that it clears the tire of the wheel to any predetermined extent, by moving the plates 34 circumferentially on the pins 20 before screwing up the nuts 35.

The levers 18 rock on the fulcrum pins 20 as the wheel moves over a rough road, and the helical springs absorb the shocks of the road, so that the shocks are not communicated to the frame and to the rider.

The front or steering wheel 44 is provided with shock absorbing springs 46 in a similar manner to the rear wheel. The springs 46 are connected by clamps 47 to the steering fork 36 which forms a portion of the frame which is supported by the road wheels. The hub of the front wheel 44 is journaled on a pin 47 carried by the shorter and front end portions 45 of the levers 48. The levers 48 are mounted to oscillate on fulcrum pins 20 similar to those hereinbefore described, and having screwthreaded end portions 21, shoulders 22, and clamping nuts 24 and 35. The pins 20 which support the levers 48 are secured to the steering fork 36, and the springs 46 permit the levers 48 to oscillate under the load and absorb the shocks of the road.

The springs 46 are arranged substantially vertical, and are clamped to the steering fork at points above the axis of the front road wheel. Plates 34 are clamped on the end portions of the fulcrum pins 20 of the levers 48, and project forwardly of the steering fork. The mud guard 50 of the front wheel 44 is of any approved cross-section, and is connected to the steering fork by a flexible, hinged or resilient bracket 51. The end portions of the front mud guard 50 are operatively supported from the free end portions of the plates 34 by rods 52 which are similar to the rods 36 of the mud guard of the rear wheel, and the position of the front mud guard is adjusted by moving the plates 34 circumferentially before clamping them to the steering fork.

The clamps which connect the helical springs to the frame of the bicycle are each secured to the respective frame members of the bicycle above the rocking levers, and the rocking levers are arranged substantially horizontal, and their longer end portions afford considerable leverage. This arrangement enables substantially vertical helical springs of considerable length to be used, and results in the rider being spared from practically all shock in riding over rough roads.

What we claim is:

1. A bicycle having fulcrum pins secured to portions of its frame, spring-controlled levers pivoted on the said pins, a road wheel journaled between the levers on one side of their pivot pins, circumferentially adjustable plates clamped on the said pivot pins, and an adjustable mud guard for the road wheel operatively connected with the free end portions of the said plates.

2. A bicycle having fulcrum pins secured to portions of its frame and having projecting screwthreaded end portions, levers pivoted on the said pins, a road wheel journaled between the end portions of the levers on one side of their pivot pins, springs which connect the other end portions of the levers with portions of the frame of the bicycle, circumferentially adjustable plates clamped on the projecting screwthreaded end portions of the said pins, and an adjustable mud guard for the said wheel operatively connected with the free end portions of the said adjustable plates.

In testimony whereof we affix our signatures.

JAMES B. DRUM.
FREDERICK J. EVERETT.